US006881167B2

(12) United States Patent
Inada

(10) Patent No.: US 6,881,167 B2
(45) Date of Patent: Apr. 19, 2005

(54) TORQUE CONTROLLING APPARATUS AND METHOD FOR HYBRID VEHICLE

(75) Inventor: Eiji Inada, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/614,820

(22) Filed: Jul. 9, 2003

(65) Prior Publication Data

US 2004/0009842 A1 Jan. 15, 2004

(30) Foreign Application Priority Data

Jul. 10, 2002 (JP) ........................................ 2002-200761

(51) Int. Cl.$^7$ ................................................ F16H 3/72
(52) U.S. Cl. .................. 475/5; 477/5; 477/6; 180/65.2; 180/65.3; 180/65.4; 180/65.6; 180/65.7
(58) Field of Search ............................. 475/5; 477/5, 6; 180/65.2, 65.3, 65.4, 65.6, 65.7

(56) References Cited

U.S. PATENT DOCUMENTS

| 6,026,921 A | * | 2/2000 | Aoyama et al. ............ 180/65.2 |
| 6,064,161 A | * | 5/2000 | Takahara et al. ............ 318/139 |
| 6,223,842 B1 | * | 5/2001 | Masaki ....................... 180/65.2 |
| 6,520,879 B1 | * | 2/2003 | Kawabata et al. ............. 475/5 |
| 6,625,534 B1 | * | 9/2003 | Suzuki et al. ................. 701/62 |
| 6,679,796 B1 | * | 1/2004 | Sugano ......................... 474/28 |
| 6,721,637 B1 | * | 4/2004 | Abe et al. ..................... 701/22 |
| 2003/0153429 A1 | * | 8/2003 | Boll .............................. 477/6 |

FOREIGN PATENT DOCUMENTS

JP 11-332011 A 11/1999

* cited by examiner

*Primary Examiner*—Saul Rodriguez
*Assistant Examiner*—David D. Le
(74) *Attorney, Agent, or Firm*—Foley & Lardner LLP

(57) ABSTRACT

In torque controlling method and apparatus for a hybrid vehicle, a vehicular propelling torque transmitted to the driven wheels is controlled under a predetermined torque distribution condition, a motor is made to perform a power running by supplying a generated electric power obtained as a result of a drive of a generator by the engine to the motor, an engine torque is distributed into both of a clutch transmission torque transmitted to the driven wheels via the clutch and a generation torque transmitted to the generator; and both of a clutch rate of the clutch and the generation torque of the generator are controlled on the basis of at least a vehicular velocity.

20 Claims, 13 Drawing Sheets

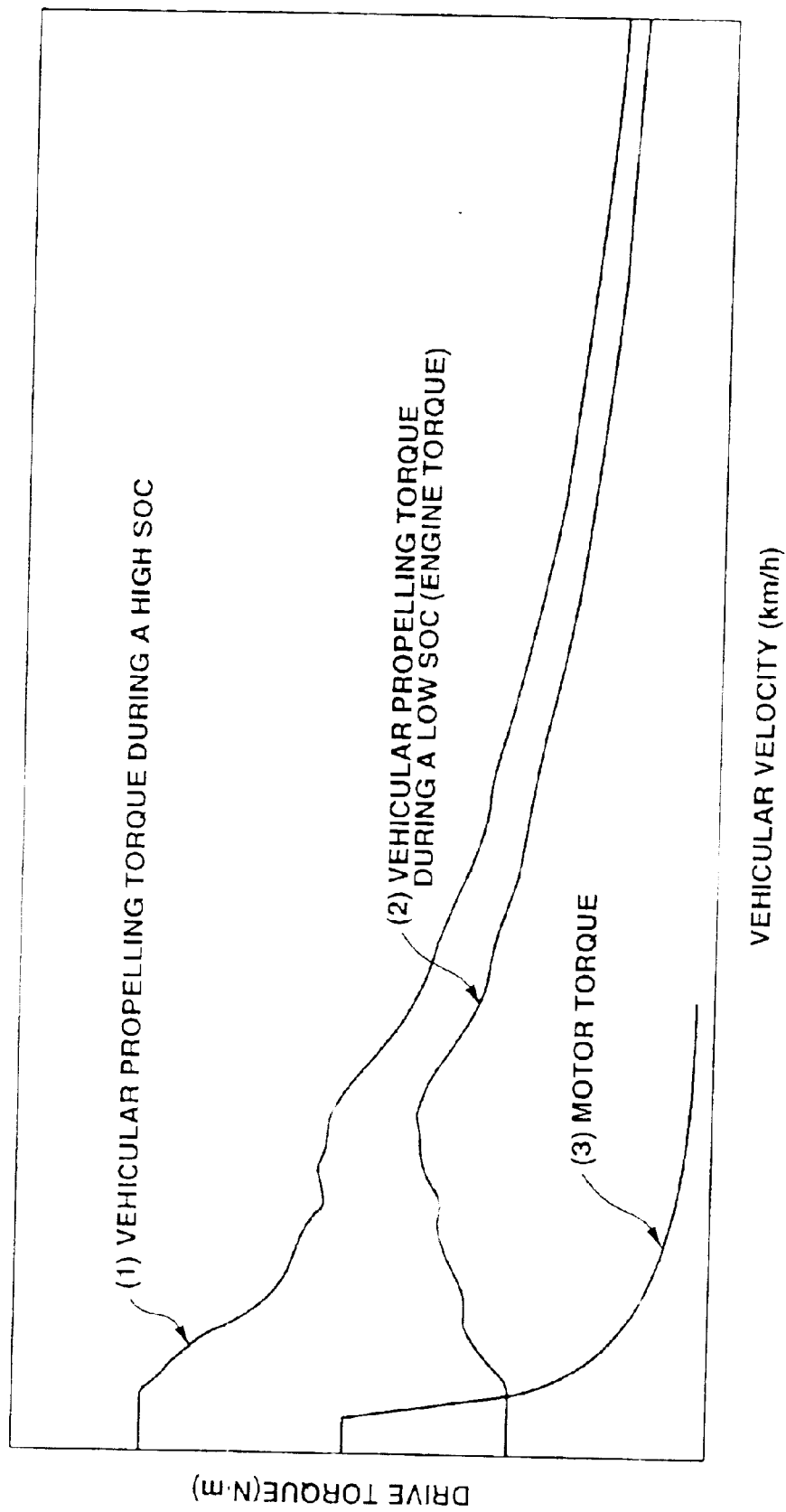

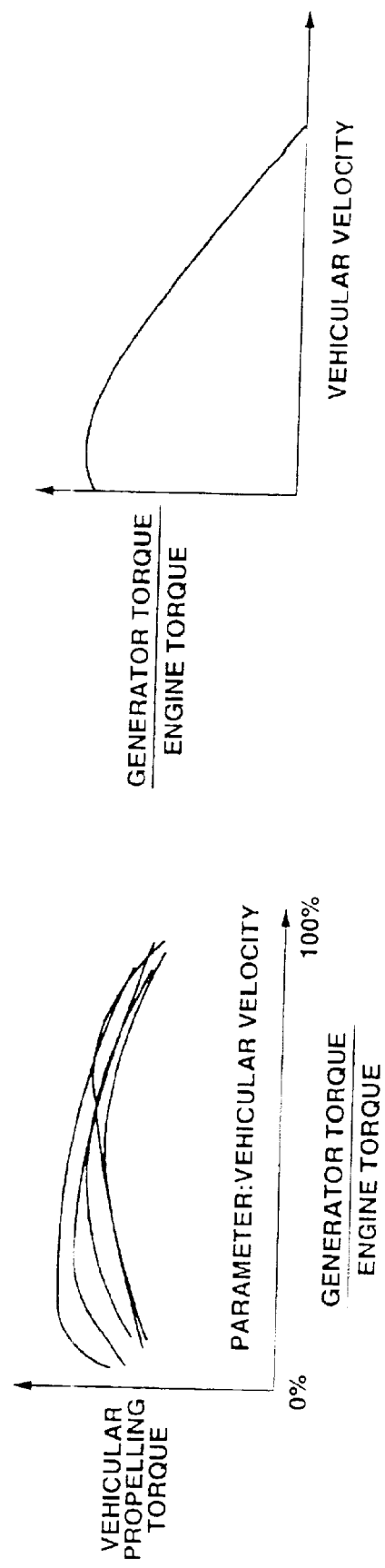

TORQUE CONTROLLING APPARATUS AND METHOD FOR HYBRID VEHICLE

BACKGROUND OF THE INVENTION

1. Field of the Invention

The present invention relates to torque controlling apparatus and method for a hybrid vehicle.

2. Description of the Related Art

In recent years, public attention has been paid to hybrid vehicles in each of which an engine and a motor are used in combination with each other as a vehicular propelling source.

A Japanese Patent Application First Publication No. Heisei 11-332011 published on Nov. 30, 1999 exemplifies a previously proposed hybrid vehicle in which a clutch is interposed between an engine and driven wheels of the vehicle and the motor is interposed between the clutch and driven wheels of the vehicle. As the clutch, a frictional clutch which transmits a power utilizing a frictional power is used which is constituted by such as a powder clutch or hydraulic multi-plate clutch.

SUMMARY OF THE INVENTION

In a case where, in the previously proposed hybrid vehicle, no limitation is placed on an output power of a battery with a state of charge (SOC), viz., the remaining charge quantity of battery sufficiently left, the motor performs a power running with an electric power from the battery and a drive torque of the motor is superposed on an engine torque to obtain a large vehicular propelling torque. However, if the state of charge of the battery (SOC) and the output power of the battery is limited or inhibited, a sufficient motor torque cannot be obtained. Therefore, there is a possibility that an insufficient vehicular propelling torque occurs during, especially, a vehicular start or low velocity running of the vehicle.

The following two methods of starting the hybrid vehicle may be considered under a situation such that the output power of the battery is limited or inhibited. (I) With the clutch under a clutched state (or semi(or half)-clutched state), the hybrid vehicle is started with the engine torque only as the vehicular propelling torque. (II) With the clutch released, a generated power obtained by a drive of the generator by means of the engine is supplied to the motor so that only the motor torque is used to start the hybrid vehicle as the vehicular propelling torque. However, the following inconveniences may occur. (I) The engine speed during the vehicular start is limited due to a durability of the clutch and the insufficient vehicular propelling torque during, particularly, a low vehicular speed may possibly be introduced. Hence, it becomes easy to make a vehicular start on a road surface having a steep gradient difficult. (II) Since, according to a characteristic of the motor, a low-speed torque of the motor is sufficiently large as compared with the engine but a high-speed torque tends to become insufficient as compare with the engine. Hence, the vehicular propelling force required to start the hybrid vehicle is easy to be secured. However, as the vehicular velocity (in order words, the motor speed) is raised, the motor torque is rapidly reduced. Hence, in a case where a rated output power of the motor is relatively small, it is impossible to raise the vehicular velocity without an unpleasant feeling to a vehicular occupant after the hybrid vehicle is started.

It is, therefore, an object of the present invention to provide a novel torque controlling apparatus and method in which a sufficient vehicular propelling force can stably be obtained with a simple structure utilizing a clutch.

The above-described object can be achieved by providing a torque controlling apparatus for a hybrid vehicle, comprising: a clutch rate adjustable clutch, an output axle of the clutch being connected to driven wheels; an engine; a generator, both of the engine and the generator being connected to an input axle of the clutch; a motor connected to the output axle of the clutch; and a controller to control a vehicular propelling torque transmitted to the driven wheels under a predetermined torque distribution condition, the controller including: a power supplying section that makes the motor perform a power running by supplying a generated electric power obtained as a result of a drive of the generator by the engine to the motor; and a torque distribution section that distributes an engine torque into a clutch transmission torque transmitted to the driven wheels via the clutch and a generation torque transmitted to the generator, the torque distribution section controlling a clutch rate of the clutch and the generation torque of the generator on the basis of at least a vehicular velocity.

The above-described object can also be achieved by providing a torque controlling method for a hybrid vehicle, the hybrid vehicle comprising: a clutch rate adjustable clutch, an output axle of the clutch being connected to driven wheels; an engine; a generator, both of the engine and the generator being connected to an input axle of the clutch; and a motor connected to the output axle of the clutch, and the torque controlling method comprising: controlling a vehicular propelling torque transmitted to the driven wheels under a predetermined torque distribution condition; making the motor perform a power running by supplying a generated electric power obtained as a result of a drive of the generator by the engine to the motor; distributing an engine torque into a clutch transmission torque transmitted to the driven wheels via the clutch and a generation torque transmitted to the generator; and controlling a clutch rate of the clutch and the generation torque of the generator on the basis of at least a vehicular velocity.

This summary of the invention does not necessarily describe all necessary features so that the invention may also be a sub-combination of these described features.

BRIEF DESCRIPTION OF THE DRAWINGS

FIG. 2 is a characteristic graph representing a vehicular propelling (drive) torque with respect to a vehicular velocity when (1) indicates a high SOC (State Of Charge), (2) indicates a low SOC, and (3) indicates only a motor torque.

FIGS. 5A and 5B are characteristic graphs representing the vehicular propelling torque with respect to a generation distribution ratio for each vehicular velocity and representing the generation torque distribution ratio for the vehicular velocity.

DETAILED DESCRIPTION OF THE PREFERRED EMBODIMENTS

Reference will hereinafter be made to the drawings in order to facilitate a better understanding of the present invention.

Figure 1:
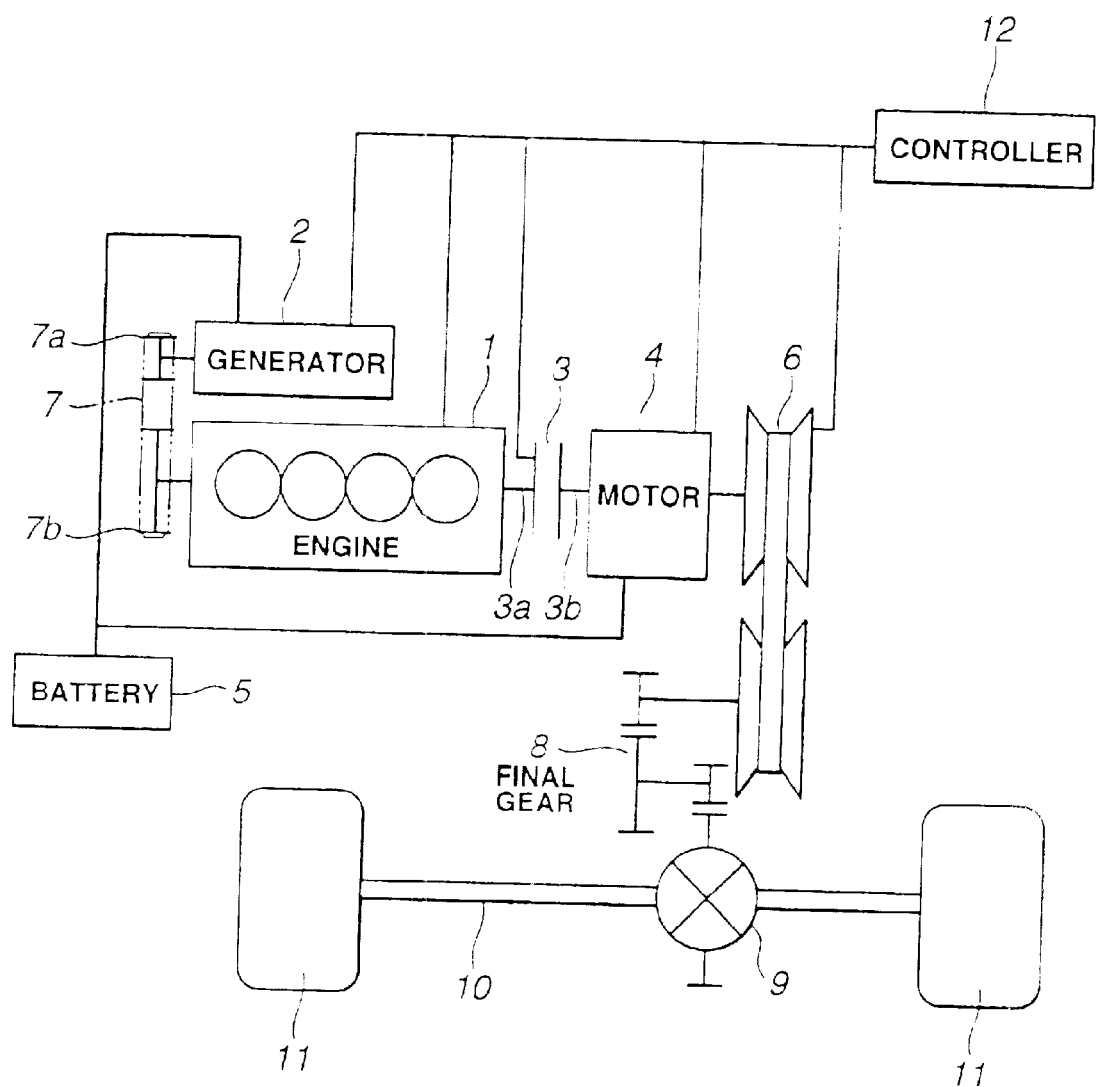
FIG. 1 is a rough configuration view of a torque controlling apparatus for a hybrid vehicle in a preferred embodiment according to the present invention.

FIG. 1 shows a schematic block diagram representing a torque controlling apparatus for a hybrid vehicle in a preferred embodiment according to the present invention.

The hybrid vehicle includes: a clutch 3 capable of continuously (or in a stepwise manner) adjusting a clutch percentage (hereinafter, referred to as a clutch rate); an engine 1 and a generator 2 connected to input axle 3a of clutch 3; and a motor 4 connected to an output axle 3b of clutch 3. A motor 4, transmission 6, a final gear 8, and a differential gear 9 are disposed on a power transmission path between an output axle 3b of clutch 3 and a drive shaft 10 connecting a pair of driven wheels 11.

Engine 1 generates a driving force by combusting a fuel such as gasoline or light oil and drives a clutch input axle 3a which integrally rotates with a crankshaft. Both generator 2 and motor 4 are connected via a battery 5 storing electric power and a well-known (DC-AC) inverter (not shown) and are constituted by a three-phase alternating type motor/generator which performs a receipt and supply from or to a power from and to a battery 5. This motor/generator can perform both of a power running and of a regeneration running. Generator 2 is linked to a crankshaft of engine 1 via a conveying belt 7 and pulleys 7a and 7b. Mainly, generator 2 drives engine 1 and a power generation is performed. During an engine restart from an idle stop, generator 2 functions as an engine start motor (starter) to crank engine 1. It is noted that, apart from generator 2, a starter may be installed which cranks engine 1 during an initial time engine start with a key operation by a driver. Motor 4 performs a power running with an electric power supplied mainly from battery 5 and functions as a running motor to which the vehicular propelling torque is solely supplied or in cooperation with engine 1 and, during a vehicular deceleration or during a braking, functions as a collecting a vehicular running energy as the electric power. Automatic transmission 6 is a belt type continuously variable transmission which shifts continuously and unlimitedly a vehicular propelling torque transmitted from engine 1 and motor 4 to the input axle and the shifted torque being transmitted to driven wheels 11. It is noted that a toriodal type continuously variable transmission or multiple-stage geared transmission utilizing a well-known planetary gear mechanism may be used as automatic transmission 6.

Clutch 3 can continuously and unlimitedly adjust its clutch rate (in other words, its slip rate) and uses a functional clutch with a simple structure such as the hydraulic multiple-plate clutch or the powder clutch. Generally, during an engine run, a clutch 3 is engaged and clutch 3 is released during an idle stop or during a motor run. A controller 12 is a well-known microcomputer system having a CPU (Central Processing Unit), a ROM (Read Only Memory), a RAM (Random Access Memory), and an Input/Output Interface. Control signals are outputted to engine 1, generator 2, clutch 3, motor 4, and automatic transmission 6. Its operations are controlled. Controller 12 executes a previously stored program on ROM to achieve a predetermined function utilizing a function and performance at which respective components are good. For example, in order to perform mainly an improvement in fuel economy and exhaust gas purification, an automatic stop of engine, viz., an idle stop function is exhibited during a temporary stop of the vehicle such as a wait for a signal turn on a traffic intersection so that an engine low-speed run during which an engine efficiency is not favorable is switched to a motor run during which only motor 4 is the vehicular propelling source. Thus, a high efficiency of an engine operating point due to an automatic transmission 6 is performed. Furthermore, a vehicular kinetic energy is regenerated by means of a motor 4 during a vehicular deceleration or during a braking.

Figure 3A:
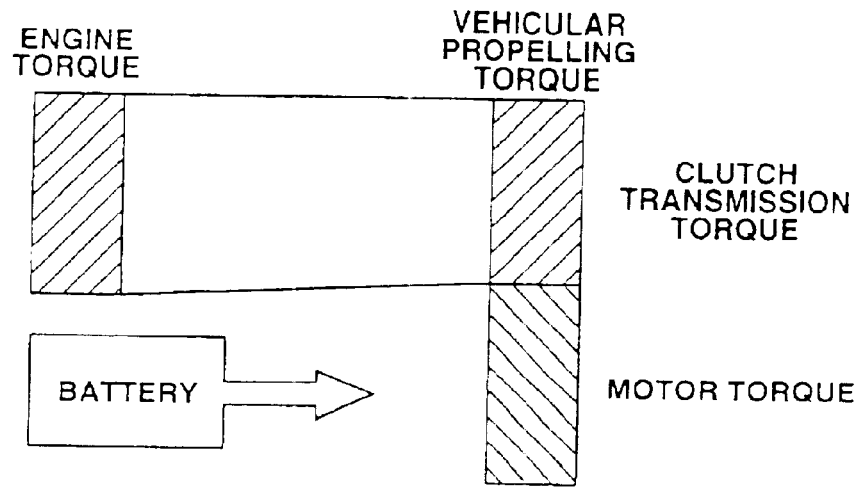
FIGS. 3A, 3B, and 3C are explanatory views for output forms of three propelling torques of FIG. 2.
Figure 3B:
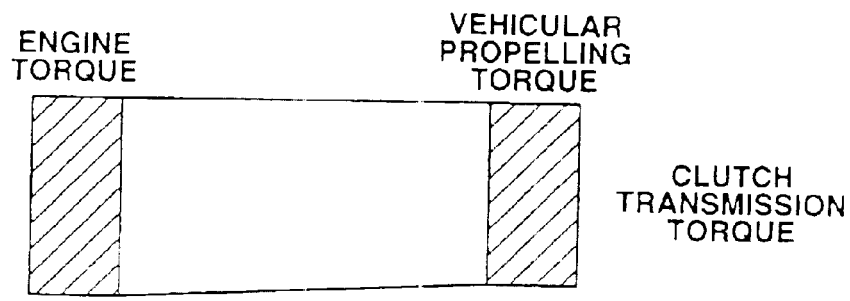
Figure 3C:
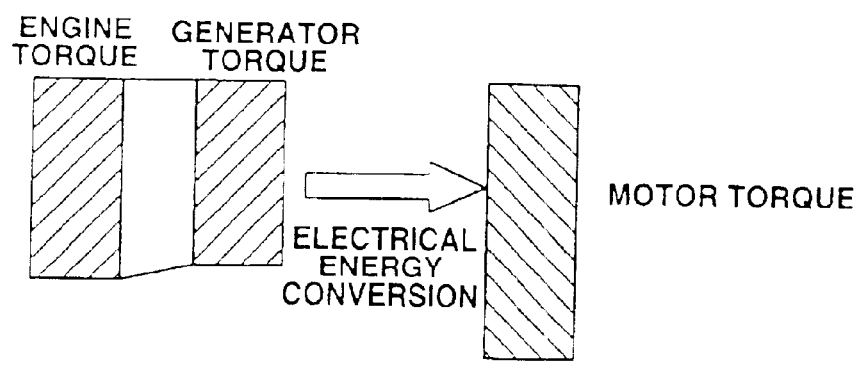

In a case where the SOC of battery 5 is sufficiently high as shown in (1) of FIG. 2 and (1) of FIG. 3 and no limitation is placed on battery output, an electric power supplied from battery 5 causes motor 4 to perform the power running and its motor torque is added onto engine torque so that the large vehicular propelling force (torque) can be obtained. Hence, the output power of engine 1 can be suppressed by an assistance by motor 4 to the vehicular propelling torque. A small-sizing (miniaturization) and light weighting of engine 1 are intended so that a further improvement in fuel economy can be expected. However, in a case where the SOC of battery 5 is low and the output of engine is limited or inhibited, there is a possibility that the vehicular propelling torque becomes insufficient under a low vehicular velocity condition such as the vehicle start if only engine torque is used as the vehicular propelling torque, as shown in (2) of FIG. 2 and in (2) of FIG. 3. Or, as shown in (3) of FIG. 2 and (3) of FIG. 3, the clutch is completely released so that the generator is driven by engine torque and, according to its generated power, the motor performs the power running. Thus, the vehicular propelling torque is tended to be insufficient as a rise in the vehicular velocity.

In this embodiment, in a case where the output from battery 5 is limited and inhibited, the vehicular propelling torque is controlled using controller 12 so that a sufficiently large vehicular propelling torque can stably be obtained. Specifically, the clutch rate of clutch 3 and power generation (generator) torque are adjustably controlled, the output torque of engine 1 is distributed into a clutch transmission torque transmitted to driven wheels 11 via clutch 3 and a generation (generator) torque transmitted to generator 2 to drive and generate generator 2. The generated power obtained from generator 2 according to generation torque is directly supplied to motor 4 without intervention of battery 5 to make motor 4 perform the power running. A desired vehicular battery propelling torque can be assured without power consumption stored in battery 5.

Figure 4:
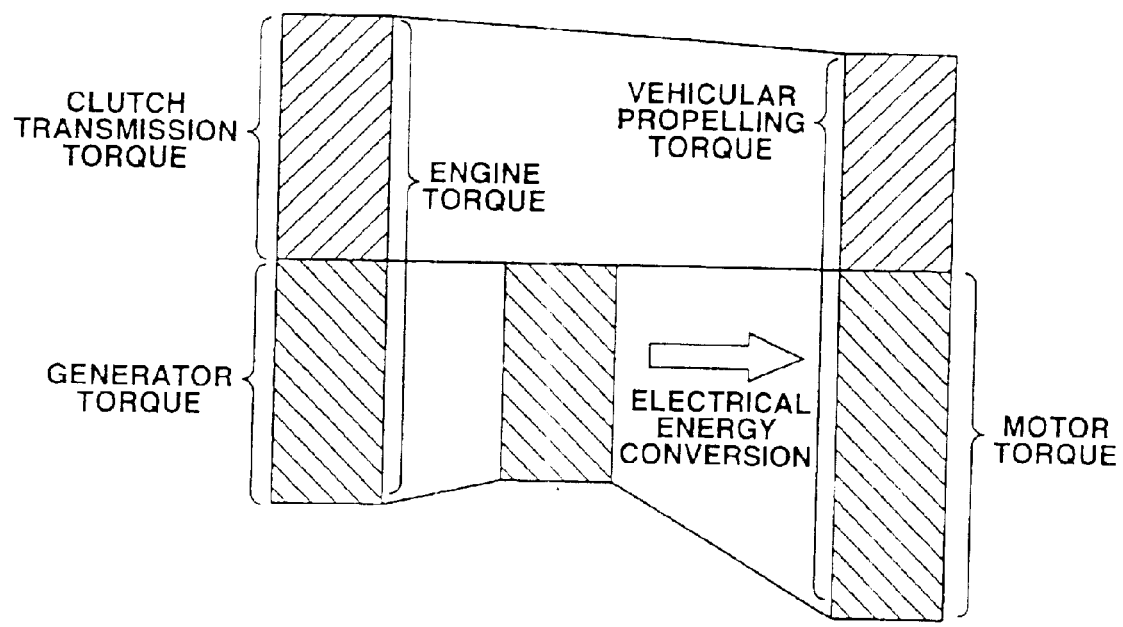
FIG. 4 is an explanatory view for explaining a concept of an engine torque distribution of the torque controlling apparatus in the preferred embodiment according to the present invention.

FIG. 4 shows an explanatory view for explaining a general concept of the preferred embodiment described above of the toque controlling apparatus. A control over the clutch rate of clutch 3 permits a magnitude of clutch transmission torque transmitted to driven wheels 11 to be adjustably controlled. In addition, generator 2 itself can control the generation torque. Hence, when both of clutch 3 and generator 2 are controlled, it becomes possible to distribute the engine torque favorably into the clutch transmission torque and generator torque. The electric power generated by generator 2 is distributed directly to drive motor 4 without charging battery 5. The generated power causes drive motor 4 to perform the power running. The sum of motor torque outputted from motor 4 between the clutch transmission torque and generator torque correspond to the vehicular propelling torque transmitted to an input axle of transmission 6. A torque distribution ratio of engine torque (clutch transmission torque: generation torque) can be modified between 100:0 and 0:100 if a frictional loss of clutch 3 is negligibly small. Preferably, utilizing the following related equations, the torque distribution ratio or clutch rate is set so that a vehicular propelling torque becomes the largest.

$Tveh = Ttm \times Rgea \times \eta gea;$ $Ttm = Tclutch + Tmotor;$ $Tclutch = Te\_cl \times \eta cl;$ $Te\_cl = Te \times Dcl;$ $Tmotor = Pgen \times \eta mtr \times 60 \times 1000/2/\pi/Nmtr (Tmotor \leq motor\ maximum\ torque);$ $Nmtr = Vsp \times 1000/60/2/\pi/Y \times Rgea;$ $Pgen = Tgen \times Ngen \times 2 \times \pi/60/1000 \times \eta gen (Pgen \leq generator\ maximum\ output)$ Tgen=Te×Dgen (Dcl+Dgen=1), wherein Ngen=engine speed and wherein Tveh: vehicular drive torque, Ttm: mission forward drive torque; Tmotor: motor torque; Te_cl: clutch distributed engine torque; Tgen: generator torque (or generation torque); Te: engine output torque; VSP: Vehicular Speed; r: tire dynamical radius; Pgen: generator generation output; Rgea: total gear; Hgea: total gear efficiency; ηcl: clutch transmission efficiency; ηgen: generator generation efficiency; ηmtr: motor efficiency; Dgen: engine torque distribution ratio to the generator; Dclutch: engine torque distribution ratio to the clutch; Ngen: generator revolution speed; and Nmtr: drive motor speed.

For example, as shown in FIG. 5A, a distribution ratio of power generation torque with respect to engine torque Dgen (or for distribution ratio Dclutch of the clutch transmission ratio with respect to the engine torque), the vehicular propelling torque is determined for each predetermined vehicular velocity. Next, as shown in FIG. 5B, the distribution ratio of the generator torque which maximizes the vehicular propelling force with respect to the vehicular velocity is prepared as a map (or a table data). Using such a map as described above, the distribution ratio of the generator torque which maximizes the vehicular propelling force is prepared as a map (or a table data). Using such a map as described above, the distribution ratio of generator torque with the vehicular velocity as a parameter can be derived and the clutch rate and generation (generator) torque can be determined according to the distraction torque of the generator torque.

Figure 6A:
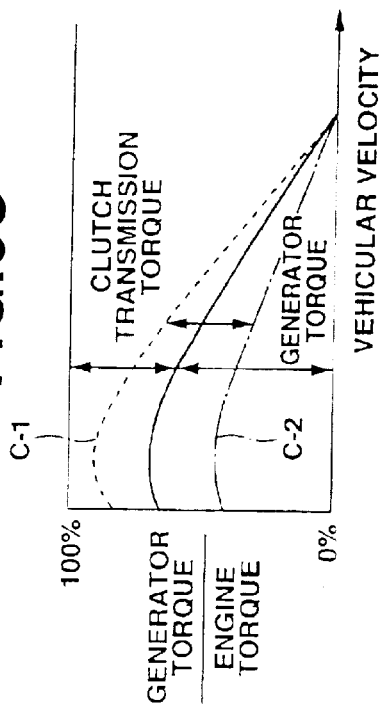
FIGS. 6A, 6B, 6C, and 6D are setting maps of a vehicular velocity-generation torque distribution ratio under a battery output inhibit condition, a simple set map of the vehicular velocity-generation torque distribution ratio, a correction map for the vehicular velocity-generation torque on the basis of the heat of generator and motor, and a correction map for the vehicular velocity-generation torque distribution ratio on the basis of an available output of the battery.

FIG. 6A is a setting map to maximize the vehicular propelling force under a situation at which the output of battery 5 is inhibited. As shown in FIG. 6A, the motor torque of drive motor 4 in a predetermined low velocity region is large so that the distribution ratio of the generator torque with respect to engine torque is relatively high and a large vehicular propelling torque can be obtained. As the vehicular velocity becomes raised (=motor speed is raised), the motor torque is reduced. With the lowered distribution ratio of generated torque with respect to engine torque lowered and the distribution ratio of the clutch transmission torque raised, the vehicular propelling torque can largely be obtained. Hence, under the predetermined low vehicular velocity, the distribution ratio of generator torque is enlarged and, as the vehicular velocity is increased, the ratio of generator torque is made small.

Figure 6B:
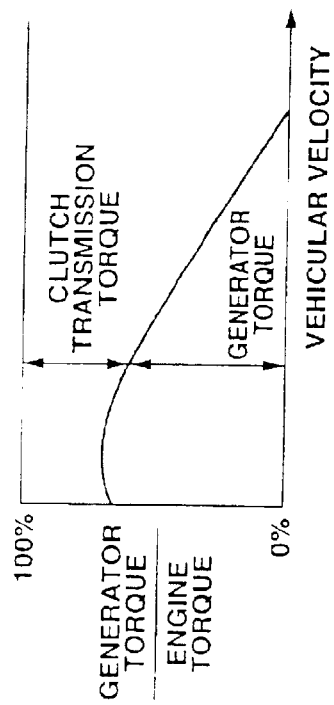
Figure 6C:
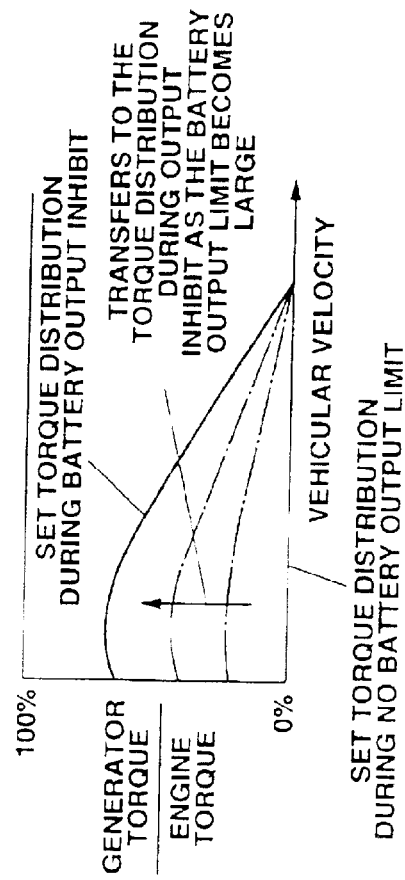
Figure 6D:
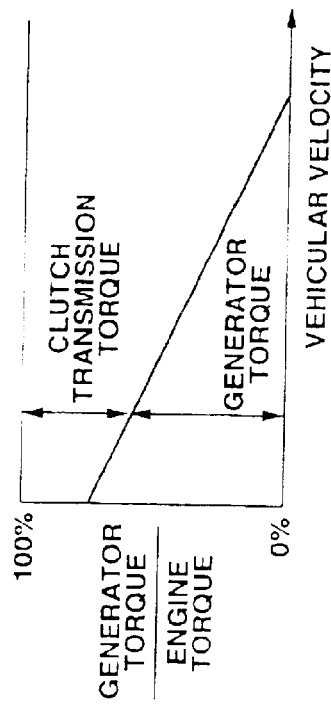

As shown in FIG. 6B, in order to make a simplification of control and a reduction of ROM capacity, the distribution ratio of generator torque may uniformly be reduced at a constant rate along with a rise in vehicular velocity. As denoted by a broken line of c-1 of FIG. 6B, a magnitude of a heat of the clutch may be detected using an appropriate temperature sensor and may be estimated from the clutch rate of clutch so that the clutch transmission torque may be limited or corrected according to the degree of heat of the clutch. Specifically, as the heat temperature of clutch 3 is increased, the distribution ratio of the clutch transmission torque is reduced. As the heat temperature of the clutch is equal to or in excess of a predetermined upper limit value, the clutch is completely released with the clutch transmission torque zeroed, viz., the clutch rate of clutch set to 0%. In a case where the engine torque is supplied to drive motor 4 by converting engine torque into an electrical energy with generator 2 and the converted electrical energy is supplied to drive motor 4, an energy loss is increased by the loss of a conversion efficiency of both of generator 2 and drive motor 4. Hence, preferably, as shown in FIG. 6D, the distribution ratio of generator torque is modified or corrected on the basis of an output enabling power of battery 5 and is made 0% when the output of battery is finally inhibited.

Figure 7:
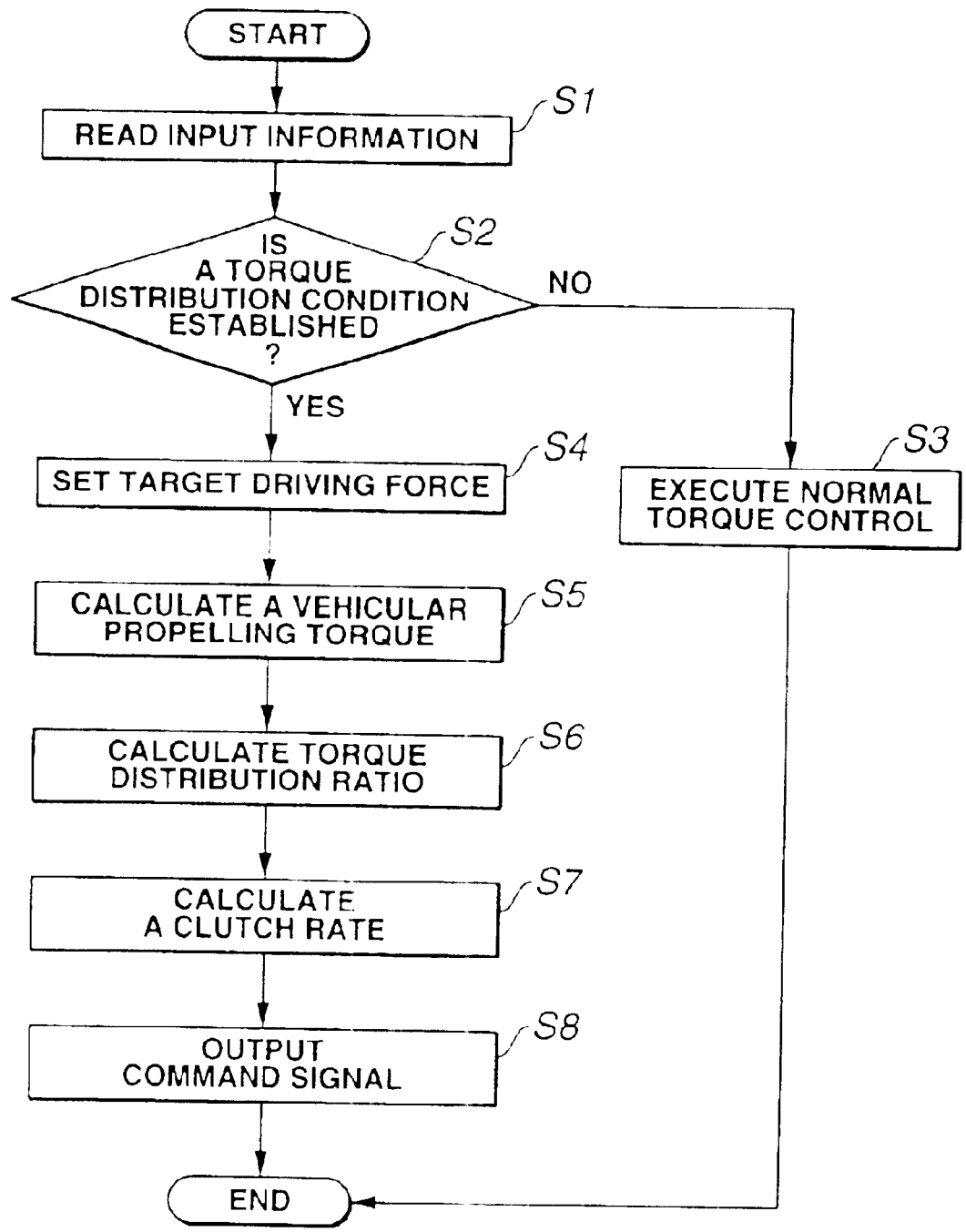
FIG. 7 is an operational flowchart representing a flow of control in the preferred embodiment according to the present invention.

FIG. 7 shows an operational flowchart representing a flow of the torque control in the preferred embodiment of the torque controlling apparatus shown in FIG. 1.

Figure 8A:
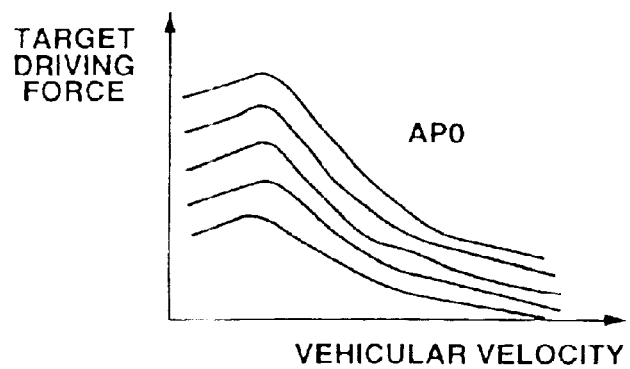
FIGS. 8A, 8B, 8C, and 8D are setting maps used in the flowchart of FIG. 7.
Figure 8B:
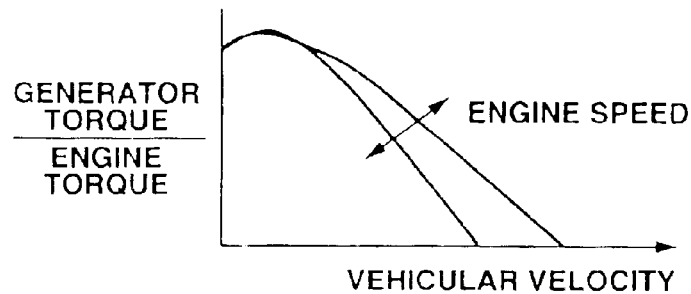
Figure 8C:
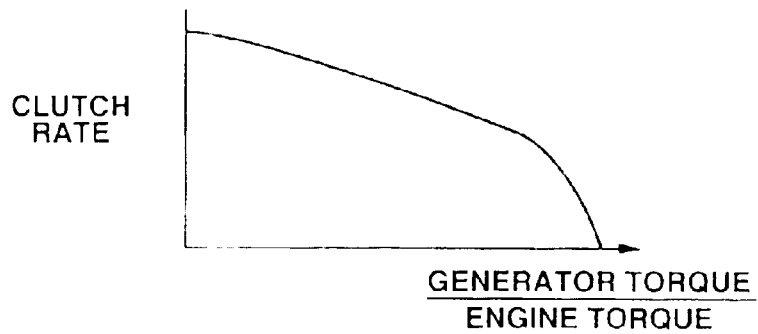
Figure 8D:
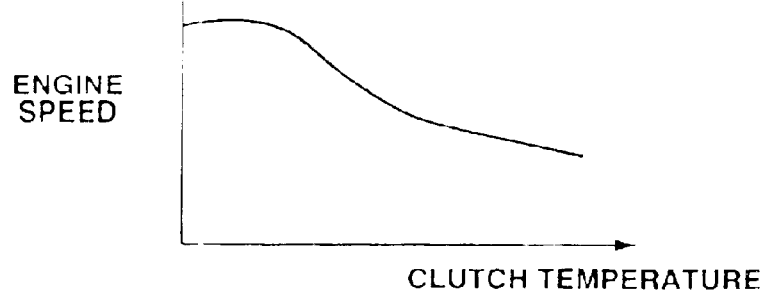

At a step S1, controller 12 reads input information on the vehicular velocity, an opening angle of accelerator pedal, a battery capacity (SOC: State Of Charge), or battery output enabling power, an engine speed, a clutch temperature, or a generator output. At a step S2, controller 12 determines whether a predetermined torque distribution condition is established on the basis of the input condition. If No at step S2, the routine of FIG. 7 goes to a step S3. At step S3, controller 12 executes a normal torque control. If the output of battery 5 is limited or inhibited, and during the vehicular start or during a low-velocity run (vehicular velocity is equal to or lower than a predetermined value), the determination at step S2 is positive and the routine goes to a step S4. At a step S4, controller 12 sets a target driving force on the basis of the vehicular velocity and opening angle of accelerator pedal by referring to such a map as shown in FIG. 8A. At a step S5, controller 12 calculates an input axle torque of transmission 6, viz., the vehicular propelling force. At a step S6, controller 12 determines the distribution ratio of generator torque with respect to the engine torque on the basis of the vehicular velocity and the engine speed by referring to the map shown in FIG. 8B. It is noted that, by referring to a map shown in FIG. 8D, the engine speed is connected on the basis of the clutch temperature. At a step S7, controller 12 determines the clutch rate of clutch 3 on the basis of the distribution rate of the generator torque by referring to a map shown in FIG. 8C. As shown in FIG. 8C, as the distribution ratio of generator torque with respect to engine torque becomes larger, the clutch rate is reduced. Then, at a step S8, controller 12 outputs command signals on such engine torque, clutch rate, generator output, and motor torque to achieve the desired vehicular propelling force.

Figure 9:
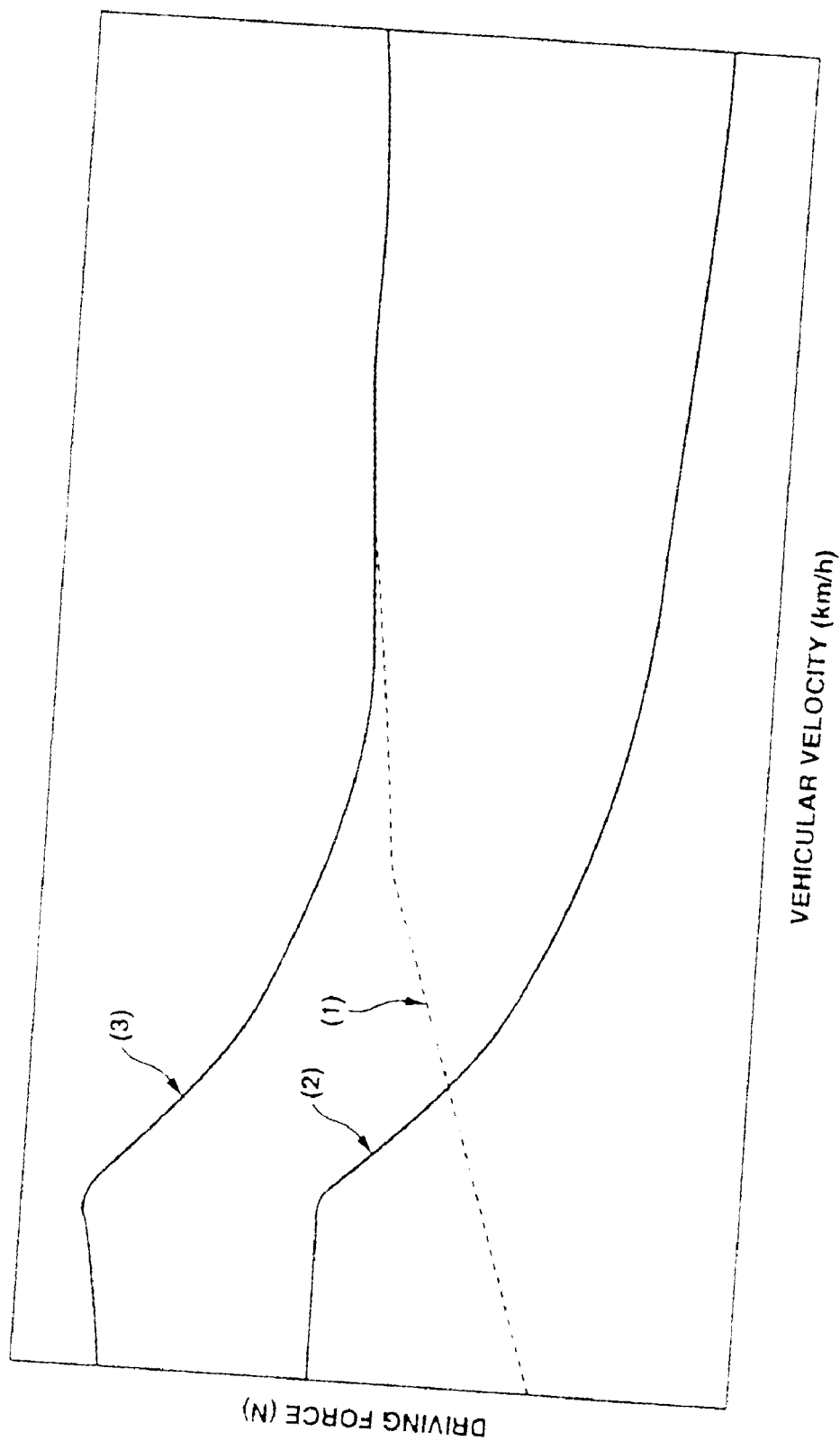
FIG. 9 is integrally characteristic graphs representing the vehicular driving forces in a case (1) only when the engine torque is outputted and in a case (2) of only a sum of engine torque and motor torque in the preferred embodiment.

FIG. 9 shows a characteristic graph representing the vehicular propelling force (driving torque) with respect to each vehicular velocity. (1) of FIG. 9 shows the case where the vehicular propelling torque is only the engine torque. (2) of FIG. 9 shows the case where the vehicular propelling force is only the motor torque. (3) of FIG. 9 shows the case where the vehicular propelling force is a sum of the engine torque and the motor torque. In the case (2) of FIG. 9, the driving torque is relatively large during the vehicular velocity being placed in the vicinity to 0 Km/h or during the vehicular start and during the extremely low vehicular velocity. However, it will be appreciated that, as the vehicular velocity is increased, the vehicular propelling torque is abruptly reduced so that the vehicular velocity becomes difficult to be raised. In the case (3) of FIG. 9, it will be appreciated that the torque controlling apparatus in the preferred embodiment described above can stably assure the sufficient vehicular propelling force at a time immediately after the vehicle is started up to a time at which the vehicular velocity is raised to fall in a low and middle velocity region.

Figure 10:
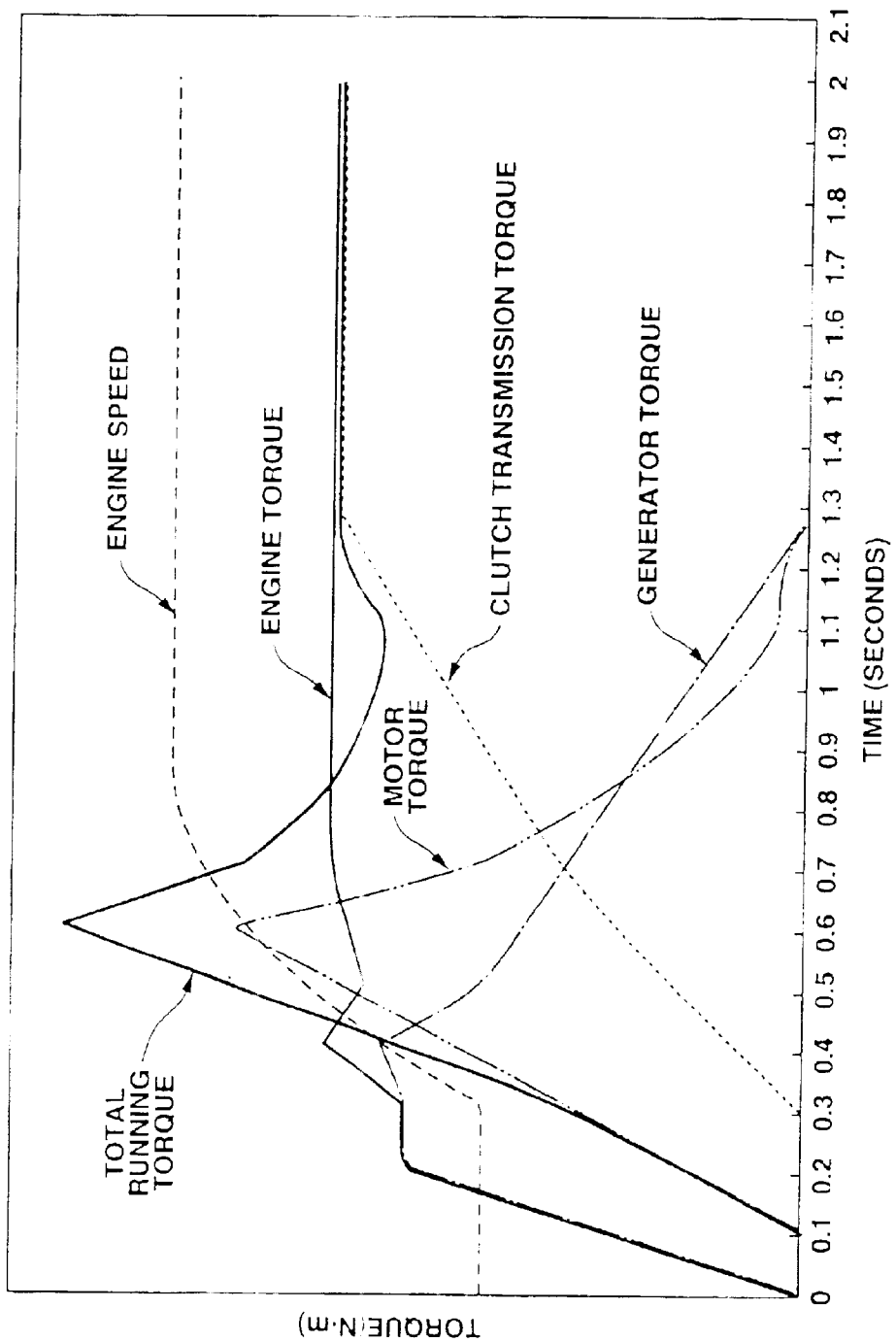
FIG. 10 is a characteristic graph representing a torque characteristic graph representing a torque characteristic immediately after the vehicle is started.

FIG. 10 shows torque characteristics of each essential part of the torque controlling apparatus in the case of the present invention immediately after the vehicle has started. As the time has elapsed, the distribution ratio of generator torque is reduced and the distribution ratio of the clutch transmission torque is increased so that a sufficient vehicular propelling force can stably be assured.

Figure 11:
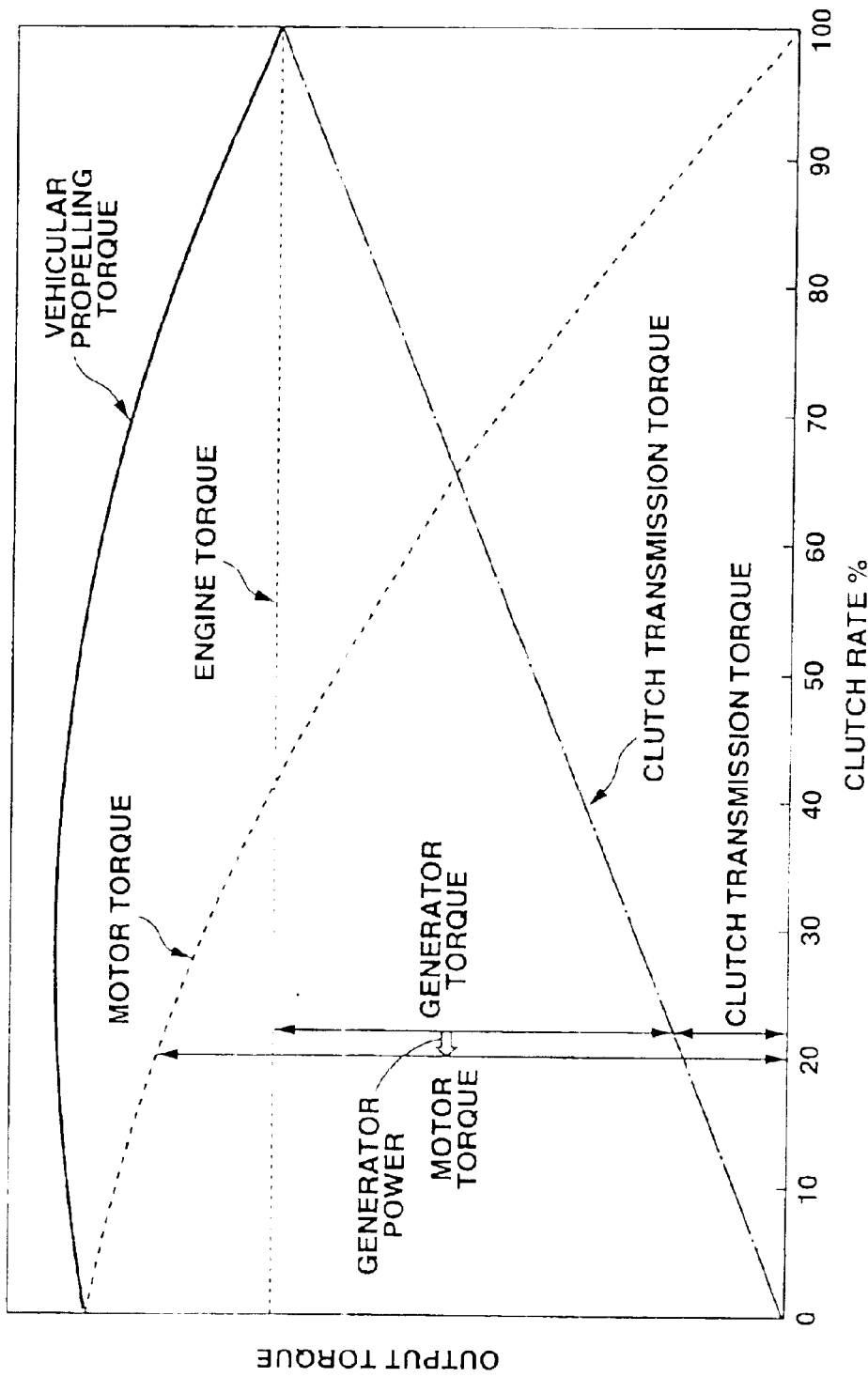
FIG. 11 is an explanatory view representing a torque characteristic with respect to a clutch clutching rate.

FIG. 11 shows the torque characteristics of the essential parts of the torque controlling apparatus with respect to the clutch rate (in %). It will be appreciated from FIG. 11 that, when the clutch rate of clutch 3 is an intermediate value, the vehicular propelling torque indicates a substantially maximum which is larger than those when the clutch rate is 0% and 100%.

Figure 12:
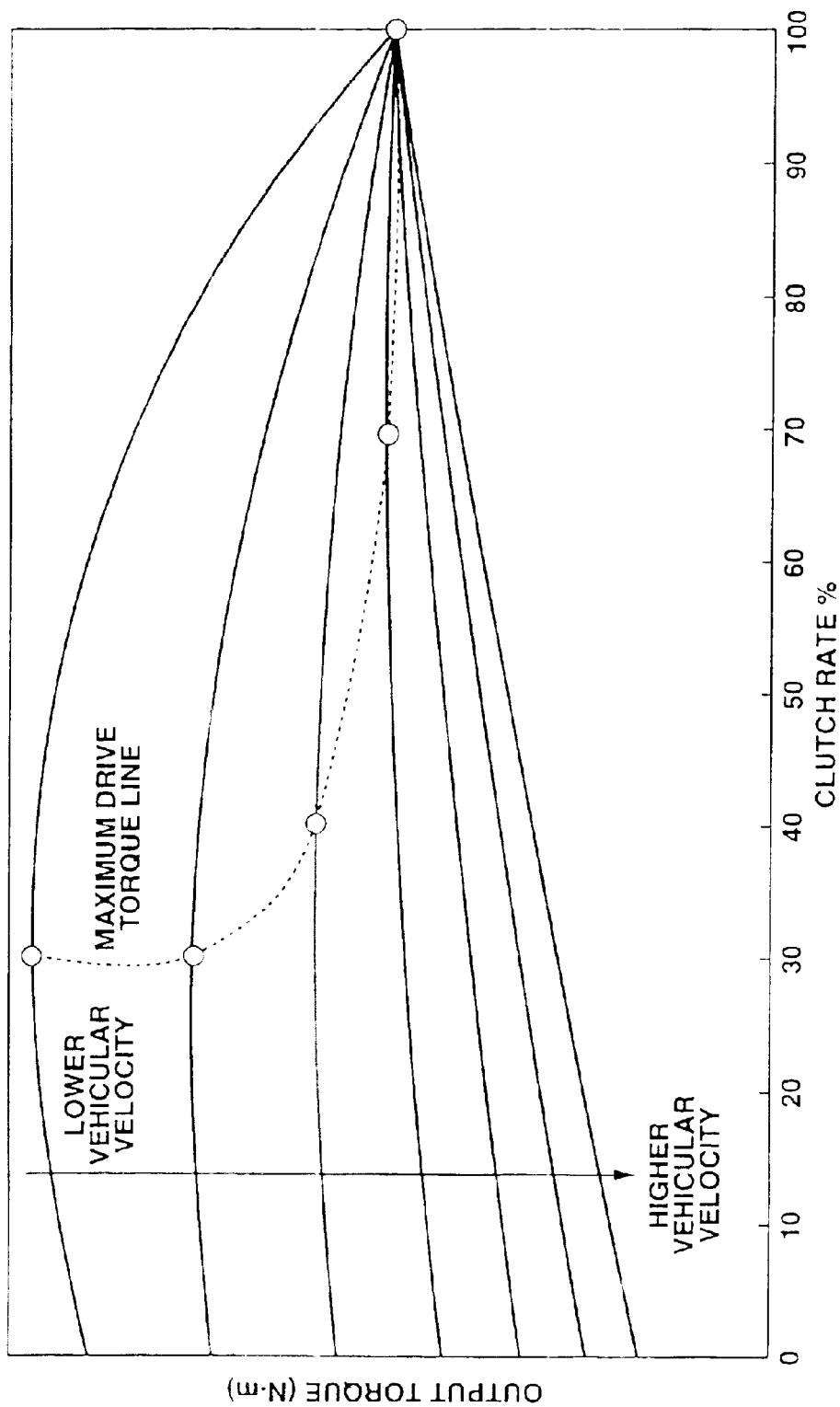
FIG. 12 is a characteristic graph representing a relationship between the clutch clutching rate for each vehicular velocity and the vehicular propelling torque

FIG. 12 shows a relationship between the clutch rate for each vehicular velocity and the vehicular propelling torque. The clutch rate at which the vehicular propelling force indicates maximum is varied in accordance with the vehicular velocity. As the vehicular velocity becomes higher, the clutch rate becomes increased.

Figure 13A:
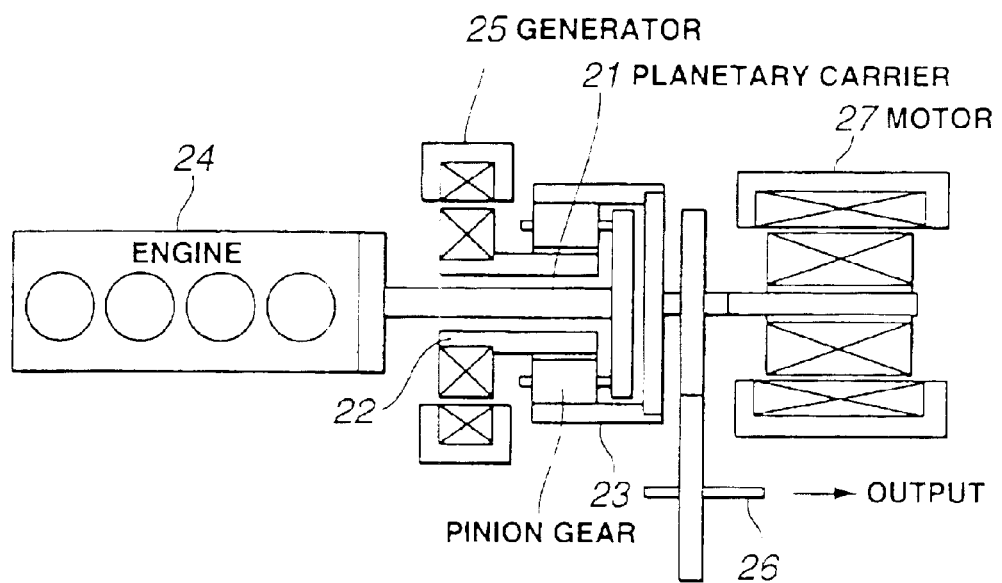
FIGS. 13A and 13B are rough configuration views of a torque distribution system utilizing a planetary gear set and the planetary gear set thereof.
Figure 13B:
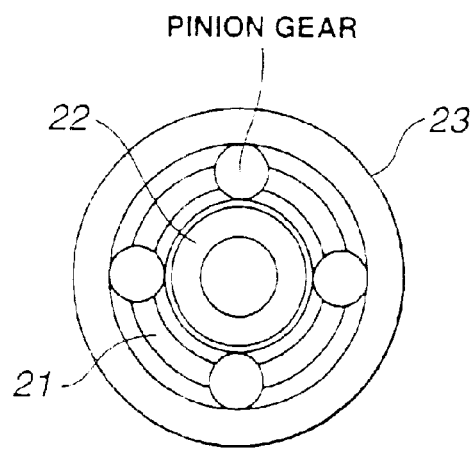

As a reference, FIGS. 13A and 13B show a torque distribution system of the hybrid vehicle connecting engine 24, generator 25, an output axle 26 to be linked to driven wheels, and drive motor 27 to three gear elements of 21, 22, and 23 of the planetary gear mechanism. In this case of the torque distribution system, the engine torque is always distributed to the driven wheel side and generator side at a constant ratio. As described in the embodiment, it is not possible to adjust the clutch to control the torque distribution ratio.

Although the torque controlling apparatus and method for hybrid vehicle have been described on the basis of the specific preferred embodiment, the present invention is not limited to the embodiment and various changes and modifications can be made without departing from the sprit and scope of the present invention. For example, the generator may be interposed serially between the engine and the input axle of the clutch or the reduction gear may be omitted. Furthermore, the drive motor and transmission may be arranged in parallel to each other on the power transmission path between the output axle of the clutch and driven wheels. It is noted that the generator torque means a torque to develop the electric power on the generator to be utilized as the power to drive the motor.

The entire contents of a Japanese Patent Application No. 2002-200761 (filed in Japan on Jul. 10, 2002) are herein incorporated by reference. The scope of the invention is defined with reference to the following claims.

What is claimed is:

1. A torque controlling apparatus for a hybrid vehicle, comprising:

a clutch rate adjustable clutch, an output axle of the clutch being connected to driven wheels;

an engine;

a generator, both of the engine and the generator being connected to an input axle of the clutch;

a motor connected to the output axle of the clutch; and a controller to control a vehicular propelling torque transmitted to the driven wheels under a predetermined torque distribution condition, the controller including: a power supplying section that makes the motor perform a power running by supplying a generated electric power obtained as a result of a drive of the generator by the engine to the motor; and a torque distribution section that distributes an engine torque into a clutch transmission torque transmitted to the driven wheels via the clutch and a generation torque transmitted to the generator, the torque distribution section controlling the clutch rate of the clutch and the generation torque of the generator on the basis of at least a vehicular velocity.

2. A torque controlling apparatus for a hybrid vehicle as claimed in claim 1, wherein the torque distribution section controls the clutch rate of the clutch and generation torque of the generator in such a manner as to maximize a vehicular propelling torque.

3. A torque controlling apparatus for a hybrid vehicle as claimed in claim 1, wherein the predetermined torque distribution condition includes a condition under which the vehicle is started or the vehicle is running at a predetermined low vehicular velocity.

4. A torque controlling apparatus for a hybrid vehicle as claimed in claim 1, wherein, as the vehicular velocity becomes higher, the clutch rate of the clutch becomes larger.

5. A torque controlling apparatus for a hybrid vehicle as claimed in claim 1, wherein a sum of the clutch transmission torque and an output torque of the motor is the vehicular propelling torque.

6. A torque controlling apparatus for a hybrid vehicle as claimed in claim 1, wherein the generator and the motor constitute a three-phase alternating current motor/generator.

7. A torque controlling apparatus for a hybrid vehicle as claimed in claim 1, wherein the clutch comprises a frictional clutch.

8. A torque controlling apparatus for a hybrid vehicle as claimed in claim 1, wherein a ratio of the distribution of the engine torque to the generator becomes reduced as the vehicular velocity becomes increased.

9. A torque controlling apparatus for a hybrid vehicle as claimed in claim 1, wherein the torque controlling apparatus further comprises a battery to perform a power supply and receipt of the electric power to and from the generator and the motor and the predetermined torque distribution condition includes a condition that an output enabling power of the battery is limited or inhibited.

10. A torque controlling apparatus for a hybrid vehicle as claimed in claim 9, wherein the power supplying section makes the motor perform the power running by supplying directly the generated power obtained by the drive of the generator by the engine to the motor without intervention of the battery.

11. A torque controlling apparatus for a hybrid vehicle as claimed in claim 9, wherein a torque distribution ratio of the generation torque with respect to the engine torque is corrected in accordance with an output enabling power of the battery.

12. A torque controlling apparatus for a hybrid vehicle as claimed in claim 11, wherein, the ratio of the distribution of the engine torque to the generation torque of the generator is 0% and the clutch rate of the clutch is 100% to completely clutch the clutch, if an output power of the battery is equal to or larger than a predetermined power value.

13. A torque controlling apparatus for a hybrid vehicle as claimed in claim 1, wherein the torque distribution ratio of the generation torque with respect to the engine torque is corrected in accordance with a magnitude of a heat of at least one of the clutch, the generator, and the motor.

14. A torque controlling apparatus for a hybrid vehicle as claimed in claim 13, the ratio of the distribution of the engine torque to the generation torque of the generator is reduced as the magnitude of the temperature of at least one of the generator and the motor becomes higher.

15. A torque controlling apparatus for a hybrid vehicle as claimed in claim 14, wherein the clutch rate of the clutch is 100% to completely clutch the clutch and the ratio of the distribution of the engine torque to the generation torque of the generator is zeroed if the magnitude of the one of the generator and the motor is in excess of a predetermined upper limit.

16. A torque controlling apparatus for a hybrid vehicle as claimed in claim 13, wherein, as a temperature of the clutch becomes higher, a ratio of the distribution of the engine torque to the clutch transmission torque becomes reduced.

17. A torque controlling apparatus for a hybrid vehicle as claimed in claim 16, wherein the clutch transmission torque is zeroed if the temperature of the clutch is in excess of a predetermined temperature value.

18. A torque controlling apparatus for a hybrid vehicle as claimed in claim 17, wherein the clutch rate of the clutch is 0% to completely release the clutch, if the clutch transmission torque is zeroed.

19. A torque controlling apparatus for a hybrid vehicle, comprising:

clutch rate adjustable clutch means, an output axle of the clutch means being connected to driven wheels;

primary power source means;

power generation means, both of the primary power source means and the power generation means being connected to an input axle of the clutch means;

secondary power source means connected to the output axle of the clutch means; and controlling means for controlling a vehicular propelling torque transmitted to the driven wheels under a predetermined torque distribution condition, the controlling means including: power supplying means for making the secondary power source perform a power running by supplying a generated electric power obtained as a result of a drive of the power generating means by the engine to the secondary power source means; and torque distribution means for distributing a torque generated by the primary power source into a clutch transmission torque transmitted to the driven wheels via the clutch means and a generation torque transmitted to the power generating means, the torque distribution means controlling a clutch rate of the clutch means and the generation torque of the power generating means on the basis of at least a vehicular velocity.

20. A torque controlling method for a hybrid vehicle, the hybrid vehicle comprising:

a clutch rate adjustable clutch, an output axle of the clutch being connected to driven wheels;

an engine;

a generator, both of the engine and the generator being connected to an input axle of the clutch; and a motor connected to the output axle of the clutch, and the torque controlling method comprising:

controlling a vehicular propelling torque transmitted to the driven wheels under a predetermined torque distribution condition;

making the motor perform a power running by supplying a generated electric power obtained as a result of a drive of the generator by the engine to the motor;

distributing an engine torque into a clutch transmission torque transmitted to the driven wheels via the clutch and a generation torque transmitted to the generator; and controlling a clutch rate of the clutch and the generation torque of the generator on the basis of at least a vehicular velocity.

* * * * *